United States Patent
Liardet et al.

(10) Patent No.: US 8,369,519 B2
(45) Date of Patent: *Feb. 5, 2013

(54) SCRAMBLING OF A CALCULATION PERFORMED ACCORDING TO AN RSA-CRT ALGORITHM

(75) Inventors: Pierre-Yvan Liardet, Peynier (FR); Yannick Teglia, Marseilles (FR)

(73) Assignee: STMicroelectronics S.A., Montrouge (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/114,184

(22) Filed: May 24, 2011

(65) Prior Publication Data

US 2011/0243321 A1 Oct. 6, 2011

Related U.S. Application Data

(63) Continuation of application No. 11/846,649, filed on Aug. 29, 2007, now Pat. No. 7,974,408.

(30) Foreign Application Priority Data

Aug. 31, 2006 (FR) ...................................... 06 53523

(51) Int. Cl.
*H04L 9/30* (2006.01)

(52) U.S. Cl. .......................................................... 380/30
(58) Field of Classification Search ..................... 380/30
See application file for complete search history.

(56) References Cited

U.S. PATENT DOCUMENTS

| 7,974,408 B2 * | 7/2011 | Liardet et al. ................... 380/30 |
| 2003/0044014 A1 * | 3/2003 | Liardet et al. ................. 380/268 |

FOREIGN PATENT DOCUMENTS

FR 2 875 355 A 3/2006

OTHER PUBLICATIONS

French Search Report dated May 11, 2007 from French Patent Application 06/53523, filed Aug. 31, 2006.

* cited by examiner

*Primary Examiner* — Kambiz Zand
*Assistant Examiner* — Aubrey Wyszynski
(74) *Attorney, Agent, or Firm* — Wolf, Greenfield & Sacks, P.C.

(57) ABSTRACT

A method and a circuit for scrambling an RSA-CRT algorithm calculation by an electronic circuit, in which a result is obtained from two modular exponentiation calculations, each providing a partial result, and from a recombination step, and in which a first step adds a digital quantity to at least one first partial result before said recombination step; and a second step cancels the effects of this quantity after the recombination step.

21 Claims, 2 Drawing Sheets

SCRAMBLING OF A CALCULATION PERFORMED ACCORDING TO AN RSA-CRT ALGORITHM

RELATED APPLICATIONS

This application is a continuation of prior application Ser. No. 11/846,649, filed on Aug. 29, 2007, now U.S. Pat. No. 7,974,408, entitled "Scrambling Of A Calculation Performed According To An Rsa-Crt Algorithm" which application claims the priority benefit of French patent application No. 05/53615, filed on Nov. 28, 2005, entitled "Scrambling Of A Calculation Performed According To An Rsa-Crt Algorithm" which applications are hereby incorporated by reference to the maximum extent allowable by law.

BACKGROUND OF THE INVENTION

1. Field of the Invention

The present invention generally relates to electronic circuits and, more specifically, to circuits executing modular exponentiation calculations according to an RSA-CRT algorithm.

The present invention more specifically applies to the protection, against piracy attempts, of a quantity (digital word), said to be private or secret, used in the process of data protection, or of authentication or identification of an electronic device (for example, a smart card or an electronic card comprising one or several integrated circuits).

The present invention especially relates to the scrambling of the execution of an RSA-CRT algorithm. "Scrambling" is used to designate a modification in the observable physical characteristics (consumption, thermal or electromagnetic radiation, etc.) induced by the operation of the electronic device executing the calculation.

2. Discussion of the Related Art

FIG. 1 very schematically shows a smart card 1 of the type to which the present invention applies as an example. Such a card 1 is formed of a support material (generally made of plastic matter) supporting or enclosing one or several electronic circuits 10. Circuit 10 communicates with the outside by means of contacts 2, connectable to a read or read/write terminal. Circuit 10 may also be associated with contactless transmission-reception means and communicate wirelessly with a terminal (be it by a hertzian or electromagnetic radiation).

FIG. 2 very schematically shows in the form of blocks an example of an electronic circuit 10 of the type to which the present invention applies. Such a circuit, for example, is that of a smart card such as shown in FIG. 1. According to another example, this circuit is assembled on an electronic board with other integrated circuits.

Circuit 10 comprises a processing unit 11 (PU), for example, a central processing unit, communicating within circuit 10 and via one or several data, address, and control buses 15, at least with one or several volatile and/or non-volatile memories 12 (MEM) and with an input/output circuit 13 (I/O). Circuit 13 is used as an interface for communication, with or without contact, with the outside of circuit 10. Most often, circuit 10 comprises other software and/or hardware functions, symbolized in FIG. 2 by a block 14 (FCT) connected to bus 15.

In a circuit 10 to which the present invention applies as an example, processing unit 11 or one of functions 14 is able to execute an algorithmic processing on digital data by implementing an algorithm known as RSA-CRT. The term "data" is used to designate any quantity exploitable by processing unit 11 or a secondary function 14, be they program instructions, addresses, actual data, controls, etc.

The RSA algorithm is an asymmetrical algorithm implementing one or several modular exponentiations and using at least two digital quantities to cipher/decipher or sign/verify data. Such quantities are called the public key (noted e) and the private key (noted d). Such an algorithm is described, for example, in work "Handbook of Applied Cryptography" by Alfred J. Menezes, Paul C. Van Oorschot, and Scott A. Vanstone, published by CRC Press in 1997, pp. 285-286.

Keys d and e are selected so that their modular multiplication, modulo $\phi(n)$, is equal to 1 ((e*d)=1 mod $\phi(n)$), where $\phi$ represents the Euler function and n the RSA modulo. The result, noted A mod b, of a modular operation (addition, multiplication, exponentiation, etc.) corresponds to the rest of the Euclidean division of A by b (b is called the modulo).

In the RSA, a ciphering of a message M comprises the calculation of a ciphered message C as being the result of modular exponentiation $M^e$ mod n. A deciphering of a message C comprises recovering clear message M as being the result of modular exponentiation $C^d$ mod n. A calculation of a signature S of a message M comprises calculating modular exponentiation $M^d$ mod n. A verification of a signature S comprises calculating modular exponentiation $S^e$ mod n to verify that message M can effectively be recovered.

In all cases, the case in point is to perform a modular exponentiation of exponent z and of modulo n from a datum Y ($X=Y^z$ mod n).

FIG. 3 illustrates, in a very simplified flowchart, an example of implementation of the RSA algorithm by applying the Chinese remainder theorem, an example of which is described in the above-mentioned work (page 612).

Such an implementation aims at accelerating the calculation of quantity $X=Y^z$ mod n by performing two partial modular exponentiations, by using two relatively prime integers p and q, such that their product p*q is equal to quantity n and that the result of the multiplication of the public and private keys is equal to one modulo (p-1)*(q-1) ((e*d)=1 mod ((p-1)*(q-1))). The smallest quantity between p and q is generally noted q. Quantities p and q should remain unknown from the outside since they provide information about the private key.

A first phase (block 21) comprises calculating two quantities z' and z" from the n modulo, from its factors p and q, and from key z, as follows:

z'=z mod(q-1); and z"=z mod(p-1).

Quantities z' and z" are modular reductions modulo q-1, respectively p-1, of quantity z. They are either calculated on the fly, that is, for each new exponentiation calculation, or precalculated and stored in memories of circuit 10.

A second phase (block 22) is a first modular exponentiation calculation of a quantity X' equal to $Y^{z'}$ mod q. In the case where quantities z' and z" have been precalculated and recorded, the introduction of datum Y intervenes for the execution of phase 22.

A third phase is a second modular exponentiation calculation (block 23) of a quantity X" equal to $Y^{z''}$ mod p, followed by the implementation (block 24) of a so-called recombination function h, having quantities X', X", p, q, and ($q^{-1}$ mod p) as operands. Quantity $q^{-1}$ mod p may have been precalculated at the same time as quantities z' and z" (block 21) and stored.

Function h comprises calculating the difference between partial results X" and X', multiplying this difference by quantity $q^{-1}$ mod p, then the obtained result by number q before adding partial result X". This amounts to executing the following equation:

$$X = [(X''-X')*(q^{-1} \bmod p)]*q + X'.$$

In practice, the calculation may take other forms, provided the result to respects that of the above equation.

For example, since p and q are relatively prime, this calculation can be written as:

$$X=[(p^{-1} \bmod q)*p*X'(q^{-1} \bmod p)*q*X'']\bmod n,$$

since:

$$(p^{-1} \bmod q)*p=1-(q^{-1} \bmod p)*q.$$

Steps 23 and 24 have been illustrated in the same phase since, in the illustrated case, they are executed in the same operator (software or hardware) while step 22 is executed by another operator. However, other implementations are possible. For example, steps 22 to 24 may also be executed by three different operators. Steps 22 and 23 may also be executed by the same operator loaded with different operands.

A disadvantage is that an execution by an electronic circuit of an RSA-CRT-type algorithm is sensitive to attacks by analysis of the consumption of the circuit executing it. In particular, such an execution is sensitive to attacks known as SPA (simple power analysis). Such attacks comprise having the calculations executed on specific data, which enable going back to the factorization of n (p and q). Now, the knowing of quantities p and q enables finding the private key.

It has already been provided to scramble the execution of an RSA algorithm by introducing random numbers into the calculation.

An example is described in U.S. patent application No. 2003/0044014. This example comprises introducing random numbers into the modulo of a modular exponentation calculation. Such a process is efficient on differential power analyses (DPA) where the attacker selects keys, but poses a problem for SPA-type attacks where the attacker selects data. In particular, the first calculation of the recombination step (block 24) is not protected in the process disclosed in this application. However, it is this calculation (difference between partial results X' and X") that is aimed at by an attack by choice of message or data.

SUMMARY OF THE INVENTION

An aspect of the present invention aims at overcoming all or part of the disadvantages of conventional methods for scrambling RSA-CRT algorithms.

An aspect of the present invention protects the execution of an RSA-CRT-type calculation against attacks by analysis, especially SPA, of the consumption of the integrated circuit executing the calculation.

An aspect of the present invention preferentially aims at not intervening within the steps of calculation of the partial modular exponentiations of the algorithm, nor within the recombination step.

According to an embodiment, the present invention provides a method for scrambling an RSA-CRT algorithm calculation by an electronic circuit, in which a result is obtained from two modular exponentiation calculations each providing a partial result and from a recombination step, and in which:

a first step adds a digital quantity to at least one first partial result before said recombination step; and a second step cancels the effects of this quantity after the recombination step.

According to an embodiment of the present invention, each partial result is modulo one of the two relatively prime numbers, the product of which represents the modulo of the modular exponentiation, said digital quantity being such that the modular addition, modulo the number from which the second partial result is obtained, of this quantity to the first partial result, is not zero.

According to an embodiment of the present invention, said digital quantity is lower than the difference between said number, from which the second partial result is obtained, and the first partial result.

According to an embodiment of the present invention, result $X_m$ of the recombination step respects the following relation:

$$X_m=[(X''-(X'+R))*(q^{-1} \bmod p)]*q+(X'+R),$$

where X' and X" designate the first and second partial results, q and p designate the first and second prime numbers from which these results are respectively obtained, and R designates said digital quantity.

According to an embodiment of the present invention, the second step applies the following relation:

$$X=X_m-R*(1-(q^{-1} \bmod p)*q).$$

According to an embodiment of the present invention:

first partial result X' corresponds to a modular exponentiation of formula $Y^{z'} \bmod q$, with z'=d mod(q−1), where d represents a private key of the RSA algorithm;

second partial result X" corresponds to a modular exponentiation of formula $Y^{z''} \bmod p$, with z"=d mod (p−1); and numbers p and q respect the following equation:

$$e*d=1 \bmod((p-1)*(q-1))$$

where e represents a public key of the RSA algorithm.

According to an embodiment of the present invention, said digital quantity is changed on each execution of the algorithm.

The present invention also provides an electronic circuit comprising means for implementing the scrambling method.

The foregoing and other objects, features, and advantages of the present invention will be discussed in detail in the following non-limiting description of specific embodiments in connection with the accompanying drawings.

DETAILED DESCRIPTION

Figure 1:
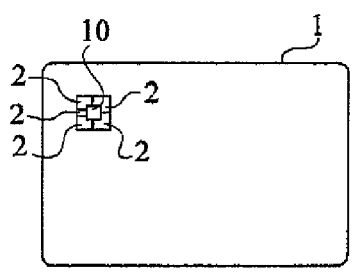
FIG. 1, previously described, is a very simplified top view of a smart card of the type to which the present invention applies as an example.
Figure 2:
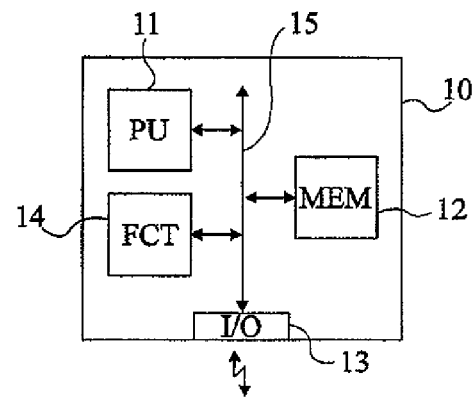
FIG. 2, previously described, very schematically shows in the form of blocks an example of an electronic circuit to which the present invention applies.

The same elements have been designated with the same reference numerals in the different drawings. Further, for clarity, only those steps and elements which are useful to the understanding of the present invention have been shown and will be described. in particular, the origin of the data to be submitted to an RSA-CRT algorithm to which the present invention applies has not been detailed, the present invention being compatible with any conventional origin of such data according to whether ciphering/deciphering or signature/verification mechanisms are involved. Similarly, the destination of the data processed by the implementation of the present invention has not been detailed, the present invention being here again compatible with any conventional exploitation.

Figure 3:
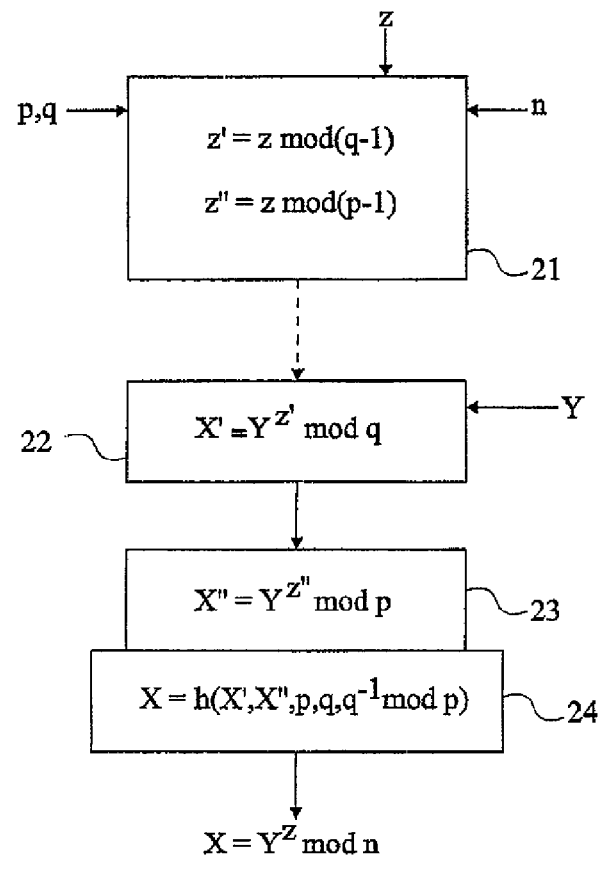
FIG. 3 previously described, is a simplified timing diagram illustrating the implementation of a conventional RSA-CRT algorithm.
Figure 4:
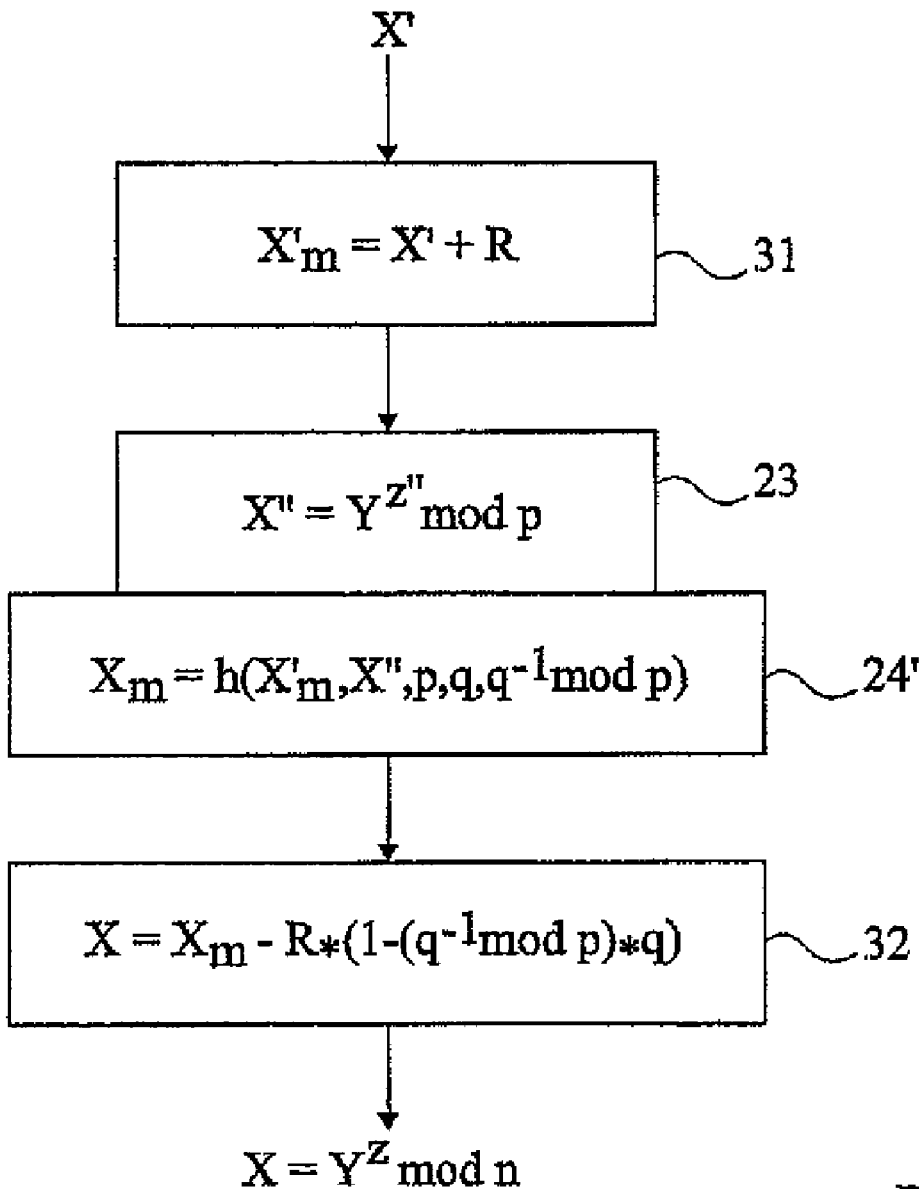
FIG. 4 very schematically shows in the form of blocks an embodiment of the present invention.

FIG. 4 is a simplified flowchart of a portion of an RSA-CRT algorithm according to an embodiment of the present invention. For simplification, the steps preceding the second partial modular exponentiation have not been illustrated, said steps being unmodified by this embodiment and are, for example, the same as phases 21 and 22 previously described in relation with FIG. 3.

According to this embodiment of the present invention, result $X'(=Y^{z'} \mod q)$ of the first partial modular exponentiation is modified (block 31) by the addition of a digital masking quantity R, into a quantity $X'_m = X'+R$. Quantity R is, preferably, an unpredictable number, typically a random number. The obtaining of quantity R may take various forms, for example, the generation of a random number, followed by a verification of conditions which will be specified hereafter. Quantity R can also be obtained by drawing from a table of recorded values and respecting the conditions which will be discussed hereafter.

Then, the second partial modular exponentiation X" is calculated (block 23') and the recombination (block 24) is implemented by using quantity $X'_m$. The operator(s) (software and/or hardware) used in this third phase are not modified by this implementation of the present invention, only input datum X' is replaced with datum $X'_m$ modified at step 31.

The result (noted $X_m$) provided by step 24 is reprocessed in a step 32 to obtain the result X which would have been calculated without the introduction of quantity R. Step 32 performs, in this preferred embodiment, the following calculation:

$$X = X_m - R*(1-(q^{-1} \mod p)*q).$$

This results represents quantity $Y^z \mod n$.

Indeed, the application of function h (step 24) to quantities $X'_m$, X", p, q, and ($q^{-1} \mod p$) represents the following equation:

$$X_m = [(X''-(X'+R))*(q^{-1} \mod p)]*q+(X'+R).$$

The application of reprocessing step 32 provides:

$$X = [(X''-(X'+R))*(q^{-1} \mod p)]*q+(X'+R)-R*(1-(q^{-1} \mod p)*q).$$

An expansion provides:

$$X = X''*(q^{-1} \mod p)*q - X'*(q^{-1} \mod p)*q - R*(q^{-1} \mod p)*q + X' + R - R*(q^{-1} \mod p)*q);$$

whereby:

$$X = X''*(q^{-1} \mod p)*q - X'*(q^{-1} \mod p)*q + X';$$

and thus:

$$X = [(X''-X')*(q^{-1} \mod p)]*q + X'.$$

Quantity R is selected so that (X'+R) mod p is different from zero. If not, the contribution of X' in the recombination is eliminated, which no longer enables finding the result.

For none of the products to risk being performed with a zero factor, quantity R is preferentially selected so that quantity X'+R is lower than quantity p.

If not, the restoring of the result (step 32, FIG. 4) should be replaced with a different calculation according to whether quantity X'+R is or not lower than p. If X'+R is greater than or equal to p, the quantity R taken into account in the equation of block 32 (and not the quantity R introduced at block 31, which is not modified) is replaced with a quantity $R_m = (X''-(X'+R)) \mod p$.

As a variation, the introduction of quantity R intervenes on the calculation of quantity X" (block 23') instead of quantity X'. In this case, all the above-described operations and conditions transpose by replacing R with −R.

According to another variation, the intervention on quantity X' is completed by a similar intervention on quantity X". This amounts to separating above-described quantity R in two quantities R' and −R" with R=R'+(−R").

The modification of the first calculated modular exponentiation X' however remains a preferred embodiment in an implementation where second phase 22 is separate from the third phase (steps 23' and 24) which comprises recombination 24. This enables not modifying the operators performing the conventional calculations of the RSA-CRT, but merely their input data.

An advantage of the present invention is that it scrambles the use of the keys against SPA-type attacks. Indeed, even if quantity R is the same for several executions, when an attacker thinks he has determined the factorization of the n modulo, the result that it obtains is false since this result takes into account the random quantity that he cannot know. With respect to the method disclosed in U.S. application 2003/0044014, the introduction of the random quantity before the recombination step causes the calculation to be resistant to SPA-type attacks, without modifying this recombination step.

Further, even if the quantity R is to be stored, the results of an attack become unexploitable if the value of quantity R is periodically modified, preferably on each execution of the RSA algorithm.

Of course, the present invention is likely to have various alterations, improvements, and modifications which will readily occur to those skilled in the art. In particular, the implementation of the present invention to protect the algorithm execution against SPA-type attacks may be combined with other scramblings (for example, those described in above-mentioned U.S. patent application 2003/0044014).

Further, the implementation of the present invention with hardware and/or software means is within the abilities of those skilled in the art based on the functional indications given hereabove, be they storage means, calculation means, random quantity generation means, etc.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for scrambling an RSA-CRT algorithm calculation by an electronic circuit, the method comprising acts of:
    calculating a first partial modular exponentiation;
    calculating a second partial modular exponentiation;
    adding a digital quantity to one of the first or second partial modular exponentiations used in the RSA-CRT algorithm before a recombination step; and
    cancelling the effects of the digital quantity in or after the recombination step.

2. The method of claim 1, wherein each of the partial modular exponentiations comprises a value obtained from modular exponentiation of data to be ciphered or deciphered.

3. The method of claim 2, wherein the first partial modular exponentiation is modulo a first of two relatively prime numbers and the second partial modular exponentiation is modulo a second of the two relatively prime numbers, and the product of the first and second of the two relatively prime numbers is equal to a modulo of a modular exponentiation that provides an equivalent result to a result obtained from the cancelling.

4. The method of claim 3, wherein said digital quantity is less than the difference between the second of the two relatively prime numbers and the first partial modular exponentiation.

5. The method of claim 4, wherein the recombination step comprises calculating a value $X_m$ according to the following relation:

$$X_m=[(X''-(X'+R))*(q^{-1} \bmod p)]*q+(X'+R),$$

where X' and X" designate the first and second partial modular exponentiations, q and p designate respectively the first and second of the two relatively prime numbers, and R designates said digital quantity.

6. The method of claim 5, wherein the act of cancelling comprises calculating a result X according to the following relation:

$$X=X_m-R*(1-(q^{-1} \bmod p)*q).$$

7. The method of claim 5, wherein:
the first partial modular exponentiation X' corresponds to a modular exponentiation of formula $Y^{z'} \bmod q$, with z'=d mod(q−1), where d represents a private key of the RSA algorithm;
second partial modular exponentiation result X" corresponds to a modular exponentiation of formula $Y^{z''} \bmod p$, with z"=d mod(p−1); and
numbers p and q respect the following equation:

$$e*d=1 \bmod((p-1)*(q-1)),$$

where e represents a public key of the RSA algorithm.

8. The method of claim 1, further comprising changing said digital quantity on each execution of the algorithm.

9. The method of claim 1, wherein the electronic circuit is incorporated in a smart card.

10. The method of claim 1, wherein the act of cancelling results in a ciphered or deciphered value, and wherein the digital quantity is selected such that a modular sum of the digital quantity and the one of the first or second partial modular exponentiations is not zero, wherein the modulo of the modular sum is a modulo used in the other of the first or second partial modular exponentiations.

11. The method of claim 1, wherein the digital quantity is a random number.

12. The method of claim 1, further comprising authenticating or identifying the electronic circuit.

13. An electronic circuit comprising:
a processor configured to add a digital quantity to a first partial modular exponentiation used in an RSA-CRT algorithm before a recombination step, to calculate a second partial modular exponentiation and to cancel the effects of the digital quantity in or after the recombination step to obtain a ciphered or deciphered value; and
input/output circuitry, wherein
the processor is configured to select the digital quantity such that a modular sum of the digital quantity and the first partial modular exponentiation is not zero.

14. The electronic circuit of claim 13, wherein the electronic circuit is incorporated in a smart card.

15. The electronic circuit of claim 13, wherein the digital quantity is a random number.

16. The electronic circuit of claim 13, wherein the recombination step combines the first and second partial modular exponentiations.

17. The electronic circuit of claim 16, wherein the first partial modular exponentiation is modulo a first of two relatively prime numbers and the second partial modular exponentiation is modulo a second of the two relatively prime numbers, and the product of the first and second of the two relatively prime numbers is equal to a modulo of a modular exponentiation that provides an equivalent result to the recombination step.

18. The electronic circuit of claim 17, wherein a modulo of the modular sum is the second of the two relatively prime numbers.

19. The electronic circuit of claim 17, wherein the digital quantity is less than the difference between the second of the two relatively prime numbers and the first partial modular exponentiation.

20. The electronic circuit of claim 19, wherein the processor is configured to calculate a value $X_m$ according to the following relation:

$$X_m=[(X''-(X'+R))*(q^{-1} \bmod p)]*q+(X'+R),$$

where X' and X" designate the first and second partial modular exponentiations, q and p designate respectively the first and second of the two relatively prime numbers, and R designates said digital quantity.

21. The electronic circuit of claim 20, wherein the processor is further configured to calculate a value X according to the following relation:

$$X=X_m-R*(1-(q^{-1} \bmod p)*q).$$

* * * * *

UNITED STATES PATENT AND TRADEMARK OFFICE
CERTIFICATE OF CORRECTION

PATENT NO. : 8,369,519 B2
APPLICATION NO. : 13/114184
DATED : February 5, 2013
INVENTOR(S) : Pierre-Yvan Liardet et al.

It is certified that error appears in the above-identified patent and that said Letters Patent is hereby corrected as shown below:

In the Specification:

Col. 4, line 58, should read:
will be described. In particular, the origin of the data to be Signed and Sealed this
Twenty-third Day of April, 2013

Teresa Stanek Rea
*Acting Director of the United States Patent and Trademark Office*